(12) United States Patent
Hamasaki et al.

(10) Patent No.: US 8,997,665 B2
(45) Date of Patent: Apr. 7, 2015

(54) SLAG-MELTING BURNER APPARATUS

(75) Inventors: Shinya Hamasaki, Nagasaki (JP);
Toshimi Ohtsuka, Nagasaki (JP);
Yoshinori Koyama, Nagasaki (JP);
Katsuhiko Yokohama, Nagasaki (JP);
Yasunari Shibata, Nagasaki (JP); Jun Kasai, Nagasaki (JP)

(73) Assignees: Mitsubishi Hitachi Power Systems, Ltd., Yokohama-Shi (JP); Joban Joint Power Co., Ltd., Tokyo (JP); Hokkaido Electric Power Company, Incorporated, Sapporo (JP); Tohoku Electric Power Co., Inc., Sendai (JP); The Tokyo Electric Power Company, Incorporated, Tokyo (JP); Chubu Electric Power Co. Inc., Nagoya-Shi (JP); Hokuriku Electric Power Company, Toyama-Shi (JP); The Kansai Electric Power Co., Inc., Osaka (JP); The Chugoku Electric Power Co., Inc., Hiroshima-Shi (JP); Shikoku Electric Power Co., Inc., Takamatsu-Shi (JP); Kyushu Electric Power Co., Inc., Fukuoka-Shi (JP); Electric Power Development Co., Ltd., Tokyo (JP); Central Research Institute of Electric Power Industry, Tokyo (JP)

( * ) Notice: Subject to any disclaimer, the term of this patent is extended or adjusted under 35 U.S.C. 154(b) by 32 days.

(21) Appl. No.: 13/120,791

(22) PCT Filed: Oct. 5, 2009

(86) PCT No.: PCT/JP2009/067365
§ 371 (c)(1),
(2), (4) Date: Apr. 12, 2011

(87) PCT Pub. No.: WO2010/041635
PCT Pub. Date: Apr. 15, 2010

(65) Prior Publication Data
US 2011/0265696 A1  Nov. 3, 2011

(30) Foreign Application Priority Data
Oct. 8, 2008  (JP) .................. 2008-261946

(51) Int. Cl.
| | | |
|---|---|---|
| F23D 14/22 | (2006.01) | |
| F23D 14/78 | (2006.01) | |
| F23J 9/00 | (2006.01) | |
| F23J 1/08 | (2006.01) | |
| F23B 90/06 | (2011.01) | |
| F23D 14/32 | (2006.01) | |
| F27D 99/00 | (2010.01) | |

(52) U.S. Cl.
CPC .............. *F23D 14/78* (2013.01); *F23D 14/22* (2013.01); *F23D 14/32* (2013.01); *F27D 99/0033* (2013.01); *Y02E 20/344* (2013.01)

(58) Field of Classification Search
CPC ......... F23D 14/22; F23D 14/32; F23D 14/78; F27D 99/0033; F23J 9/00; F23J 1/08
USPC ......... 110/229, 165, 266, 347, 235, 260–265, 110/230; 431/160; 48/210, 200; 239/132, 239/132.1, 132.3, 132.5, 128; 266/265, 266/267, 268
See application file for complete search history.

(56) References Cited

U.S. PATENT DOCUMENTS

| | | | | |
|---|---|---|---|---|
| 2,781,190 A | * | 2/1957 | Weir | 266/189 |
| 3,175,817 A | * | 3/1965 | Smith et al. | 239/403 |
| 3,310,238 A | * | 3/1967 | Bryant et al. | 239/132.3 |
| 3,337,203 A | * | 8/1967 | Smith et al. | 239/132.3 |
| 4,338,870 A | * | 7/1982 | Lanier, Jr. | 588/320 |
| 4,752,330 A | * | 6/1988 | Gitman | 75/553 |
| 4,865,297 A | * | 9/1989 | Gitman | 266/226 |
| 4,865,542 A | * | 9/1989 | Hasenack et al. | 431/160 |
| 5,138,765 A | * | 8/1992 | Watson et al. | 29/890.042 |
| 5,276,966 A | * | 1/1994 | Grant et al. | 29/890.042 |

| | | | | |
|---|---|---|---|---|
| 5,350,158 | A * | 9/1994 | Whellock | 266/46 |
| 5,511,725 | A * | 4/1996 | Barker et al. | 239/8 |
| 6,202,574 | B1 * | 3/2001 | Liljedahl et al. | 110/233 |
| 6,398,842 | B2 * | 6/2002 | Dunne | 266/225 |
| 8,012,409 | B2 * | 9/2011 | Tierney et al. | 266/217 |
| 8,211,357 | B2 * | 7/2012 | Hayton | 266/47 |
| D674,649 | S * | 1/2013 | Ludwig et al. | D7/300.2 |
| 2006/0175742 | A1 * | 8/2006 | Takayama et al. | 266/111 |

FOREIGN PATENT DOCUMENTS

| | | |
|---|---|---|
| CN | 1662633 A | 8/2005 |
| CN | 1916493 A | 2/2007 |
| EP | 0737754 A2 | 10/1996 |
| JP | 60-4720 A | 1/1985 |
| JP | 63135492 A * 6/1988 ............ C10J 3/50 |  |
| JP | 6-306373 A | 11/1994 |
| JP | 8003104 | 1/1996 |
| JP | 8-312937 A | 11/1996 |
| JP | 11-051334 A | 2/1999 |
| JP | 2004-101083 A | 4/2004 |
| JP | 2007-278581 A | 10/2007 |
| WO | WO 92/07965 A1 | 5/1992 |
| WO | WO 02/08665 A1 | 1/2002 |

OTHER PUBLICATIONS

Chinese Office Action issued Sep. 13, 2012 including the Chinese Search Report and English Translation of the Chinese Search Report.
Japanese Decision to Grant a Patent issued in Japanese Patent Application No. 2008-261946 on Feb. 5, 2013.
Chinese Office Action issued in Chinese Patent Application No. 200980138677.9 on Jul. 30, 3013.
Korean Decision to Grant a Patent issued in Korean PatentApplication No. 2011-7007878 on Aug. 26, 2013.
Extended European Search Report issued in European Application No. 09819169.5 on Jul. 25, 2014.
Australian Notice of Allowance issued Nov. 25, 2014 in Australian Patent Application No. 2009301682.

* cited by examiner

*Primary Examiner* — Kenneth Rinehart
*Assistant Examiner* — Tavia Sullens
(74) *Attorney, Agent, or Firm* — Birch, Stewart, Kolasch & Birch, LLP

(57) ABSTRACT

A leading end located in a two-stage entrained-flow bed coal gasifier has a double-walled structure including an outer cylinder and an inner cylinder, and cooling water for cooling the leading end is supplied through an interior of the inner cylinder to cool the leading end and is then returned to a base end through a space formed between the outer cylinder and the inner cylinder. The space formed between the outer cylinder and the inner cylinder has a smaller channel area than the interior of the inner cylinder, and a swirling flow along a guide formed on an outer circumferential surface of the inner cylinder and a substantially linear flow in a longitudinal direction of the outer cylinder and the inner cylinder are applied to the cooling water returned to the base end through the space formed between the outer cylinder and the inner cylinder.

9 Claims, 10 Drawing Sheets

SLAG-MELTING BURNER APPARATUS

BACKGROUND OF THE INVENTION

1. Field of the Invention

The present invention relates to slag-melting burner apparatuses capable of easily melting and cutting solid slag and icicle-shaped slag deposited and grown around a slag hole.

2. Description of Related Art

Patent Literature 1 discloses an example of a known slag-melting burner apparatus capable of melting and cutting solid slag and icicle-shaped slag deposited and grown around a slag hole.

CITATION LIST

Patent Literature
Patent Literature 1
Japanese Unexamined Patent Application, Publication No. HEI-8-312937

SUMMARY OF INVENTION

Technical Problem

In the slag-melting burner apparatus disclosed in Patent Literature 1 above, cooling water for cooling a leading end inserted into a two-stage entrained-flow bed coal gasifier is guided to the vicinity of the leading end through a cooling water pipe and is then discharged outside through a cooling water outlet formed in an outer cylinder. Therefore, part of the cooling water cooling the leading end evaporates before reaching the cooling water outlet, and a layer of steam covers the inner circumferential surface of the outer cylinder and decreases the heat transfer coefficient thereof, thus posing the risk of heat damage to the outer cylinder due to an abrupt rise in the wall temperature of the outer cylinder.

In addition, a slag-melting burner apparatus uses pure oxygen as an oxidant for fuel, and the leading end of the burner must be sufficiently cooled without variations to prevent burnout. In the slag-melting burner apparatus disclosed in Patent Literature 1 above, in which the cooling water is guided to the vicinity of the leading end through the cooling water pipe, the entire leading end of the burner cannot be uniformly and efficiently cooled because variations in cooling efficiency occur between the vicinity of the outlet of the cooling water pipe and the other regions. Thus, particularly for a large burner, the leading end of the burner may have an insufficiently cooled region that could result in burnout.

An object of the present invention, which has been made in light of the above circumstances, is to provide a slag-melting burner apparatus capable of preventing a phenomenon (DNB: departure of nuclear boiling) by which the wall temperature of an outer cylinder rises abruptly as a layer of steam covers the inner circumferential surface of the outer cylinder and therefore decreases the heat transfer coefficient thereof, thus preventing heat damage to the outer cylinder.

Solution to Problem

To solve the above problem, the present invention employs the following solutions.

A slag-melting burner apparatus according to a first aspect of the invention is a slag-melting burner apparatus for a two-stage entrained-flow bed coal gasifier that combusts pulverized coal carried by a gas in a combustor and feeds pulverized coal similarly carried by a gas to a combustion gas in a reductor to carbonize and gasify the pulverized coal while discharging incombustible residue from a slag hole as molten slag. A leading end located in the two-stage entrained-flow bed coal gasifier has a double-walled structure including an outer cylinder and an inner cylinder, and cooling water for cooling the leading end is supplied through the interior of the inner cylinder to cool the leading end and is then returned to a base end through a space formed between the outer cylinder and the inner cylinder. The space formed between the outer cylinder and the inner cylinder has a smaller channel area than the interior of the inner cylinder, and a swirling flow along a guide formed on an outer circumferential surface of the inner cylinder and a substantially linear flow in a longitudinal direction of the outer cylinder and the inner cylinder are applied to the cooling water returned to the base end through the space formed between the outer cylinder and the inner cylinder.

In the slag-melting burner apparatus according to the first aspect of the invention, the leading end located in the two-stage entrained-flow bed coal gasifier (for example, a portion inserted into a kerosene combustion chamber) has a double-walled structure including the outer cylinder and the inner cylinder, and the cooling water that has been supplied through the interior of the inner cylinder to the leading end (for example, to a burner tip metal 45 and a mounting cap 46 shown in FIG. 3) and that has cooled the leading end (for example, the burner tip metal 45, the burner tip, and the mounting cap 46) is returned to the base end (for example, to a front chamber 44 shown in FIG. 3) through the space between the inner cylinder and the outer cylinder, which has a smaller channel area than the inner cylinder. At this time, the cooling water flowing into the space between the outer cylinder and the inner cylinder flows downstream at an increased flow speed, for example, as shown in FIG. 6, as a swirling flow F1 along a guide 49 and a substantially linear flow F2 in the longitudinal direction of an outer cylinder 41 and an inner cylinder 42.

This prevents a phenomenon (DNB: departure of nuclear boiling) by which the wall temperature of the outer cylinder rises abruptly as a layer of steam covers the inner circumferential surface of the outer cylinder and therefore decreases the heat transfer coefficient thereof, thus preventing heat damage to the outer cylinder.

In addition, it is possible to prevent burnout of the burner resulting from insufficient cooling due to variations in cooling efficiency at the leading end of the burner.

More preferably, in the slag-melting burner apparatus according to the first aspect, an extremity of the leading end has a smaller channel area than the interior of the inner cylinder.

In the above slag-melting burner apparatus, because the channel area of the extremity of the leading end (for example, each of the channel area between the inner circumferential surfaces of reducers 47 and 48 and the burner tip metal 45, the channel area between the front end surfaces of the reducers 47 and 48 and the rear end surface of the burner tip metal 45, and the channel area between the outer circumferential surfaces of the reducers 47 and 48 and the inner circumferential surface 41a of the outer cylinder 41, shown in FIG. 3) is set to be smaller than the channel area of the inner cylinder, the flow speed of the cooling water at the leading end (for example, the burner tip metal 45, the burner tip, and the mounting cap 46 shown in FIG. 3) can be increased to efficiently cool the leading end, thus preventing heat damage to the leading end.

More preferably, in the slag-melting burner apparatus according to the first aspect, the leading end located in the two-stage entrained-flow bed coal gasifier is extendable into and retractable from the two-stage entrained-flow bed coal gasifier.

In the above slag-melting burner apparatus, the leading end located in the two-stage entrained-flow bed coal gasifier (for example, a portion inserted into a kerosene combustion chamber) can be retracted from the two-stage entrained-flow bed coal gasifier (for example, from a kerosene combustion chamber 3 shown in FIGS. 1 and 2) when the slag-melting burner apparatus is not in use (not in operation).

This more effectively prevents heat damage to the leading end of the slag-melting burner apparatus located in the two-stage entrained-flow bed coal gasifier.

A two-stage entrained-flow bed coal gasifier according to a second aspect of the invention includes a slag-melting burner apparatus having superior heat resistance.

For the two-stage entrained-flow bed coal gasifier according to the second aspect of the invention, procedures for replacing a slag-melting burner apparatus damaged by heat can be significantly reduced, thus significantly improving the availability of the two-stage entrained-flow bed coal gasifier and also improving the reliability of the entire two-stage entrained-flow bed coal gasifier.

A coal gasification combined cycle power plant according to a third aspect of the invention includes a two-stage entrained-flow bed coal gasifier having superior reliability.

For the coal gasification combined cycle power plant according to the third aspect of the invention, the reliability of the entire coal gasification combined cycle power plant can be improved.

Advantageous Effects of Invention

The slag-melting burner apparatus according to the invention provides the advantage of preventing a phenomenon (DNB: departure of nuclear boiling) by which the wall temperature of the outer cylinder rises abruptly as a layer of steam covers the inner circumferential surface of the outer cylinder and therefore decreases the heat transfer coefficient thereof, thus preventing heat damage to the outer cylinder.

The slag-melting burner apparatus according to the invention also provides the advantage of preventing burnout of the burner resulting from insufficient cooling due to variations in cooling efficiency at the leading end of the burner.

DETAILED DESCRIPTION OF THE INVENTION

An embodiment of a slag-melting burner apparatus according to the present invention will be described below with reference to FIGS. 1 to 12.

Figure 1:
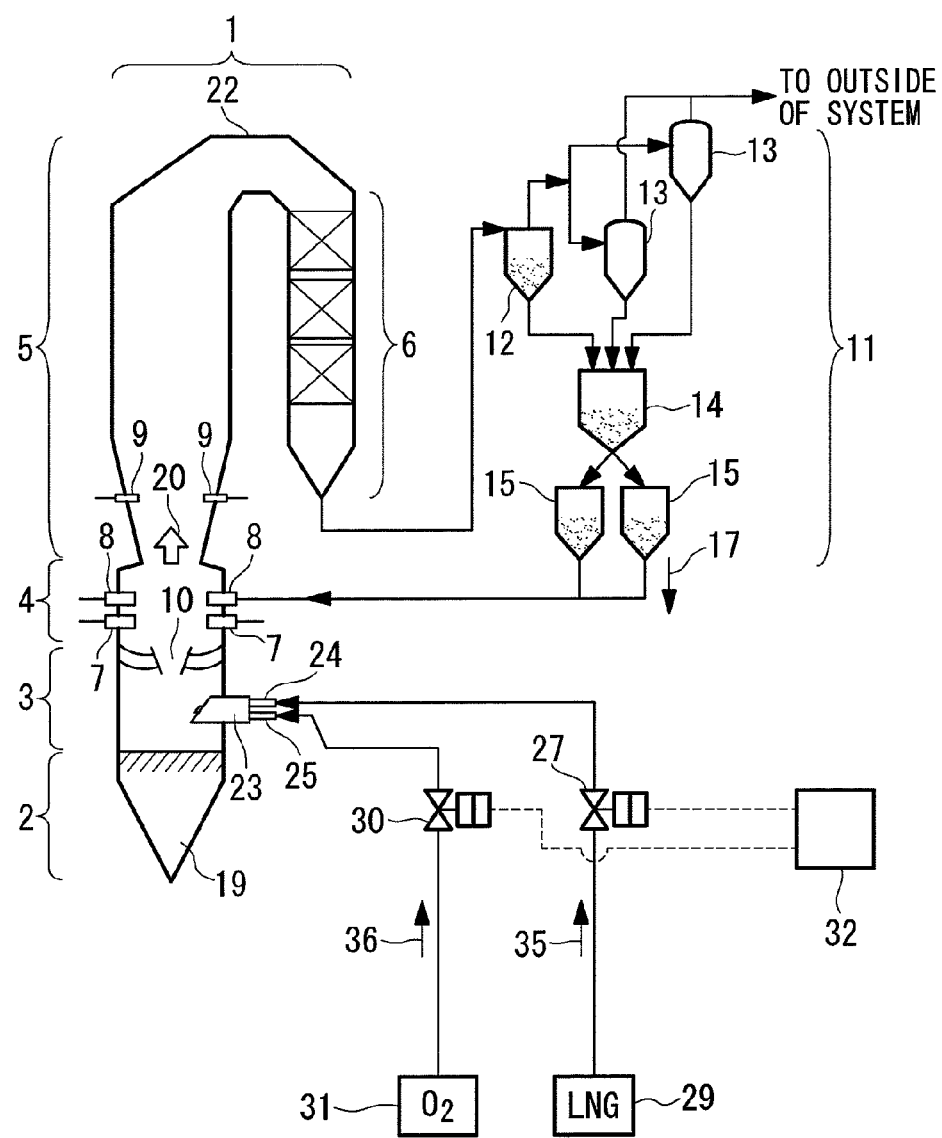
FIG. 1 is a system diagram showing part of a coal gasification combined cycle power plant including a two-stage entrained-flow bed coal gasifier having a slag-melting burner apparatus according to an embodiment of the invention and char recovery equipment.

FIG. 1 is a system diagram showing part of a coal gasification combined cycle power plant including a two-stage entrained-flow bed coal gasifier having a slag-melting burner apparatus according to this embodiment and char recovery equipment.

In FIG. 1, reference sign 1 denotes a two-stage entrained-flow bed coal gasifier (hereinafter referred to as "gasifier"), reference sign 2 denotes a slag hopper, reference sign 3 denotes a kerosene combustion chamber (also referred to as "slag-melting burner combustion chamber"), reference sign 4 denotes a combustor, reference sign 5 denotes a reductor, reference sign 6 denotes a rear heat exchanger, reference sign 7 denotes a combustor burner, reference sign 8 denotes a char burner, reference sign 9 denotes a reductor burner, reference sign 10 denotes a slag hole, reference sign 11 denotes char recovery equipment, reference sign 12 denotes a cyclone, reference sign 13 denotes a porous filter, reference sign 14 denotes a char bin, reference sign 15 denotes a char supply hopper, reference sign 17 denotes char, reference sign 19 denotes slag hopper water, reference sign 20 denotes high-temperature exhaust gas, and reference sign 22 denotes a crossover.

In FIG. 1, additionally, reference sign 23 denotes a slag-melting burner apparatus, reference sign 24 denotes a fuel pipe (LNG pipe), reference sign 25 denotes an oxidant pipe (oxygen pipe), reference sign 27 denotes an LNG valve, reference sign 29 denotes LNG supply equipment, reference sign 30 denotes an oxygen valve, reference sign 31 denotes oxygen supply equipment, reference sign 32 denotes a control panel, reference sign 35 denotes LNG (LNG fuel), and reference sign 36 denotes oxygen (pure oxygen).

As shown in FIG. 1, a gasifier 1 includes a slag hopper 2, a kerosene combustion chamber 3, a combustor 4, a reductor 5, and a rear heat exchanger 6, and char recovery equipment 11 is provided downstream thereof.

The slag hopper 2 stores a predetermined amount of slag hopper water 19. In addition, the kerosene combustion chamber 3 has one or two slag-melting burner apparatuses 23, the combustor 4 has a plurality of combustor burners 7 and a plurality of char burners 8, and the reductor 5 has a plurality of reductor burners 9. A slag hole 10 is provided in the bottom of the combustor 4.

The rear heat exchanger 6 is coupled to the reductor 5 with a crossover 22. In addition, char recovery equipment 11 including one or more cyclones 12, one or more porous filters 13, and a char bin 14 is disposed downstream of the rear heat exchanger 6.

Coal milled to several microns to several tens of microns by milling equipment (not shown) is supplied as coal for heat load to the combustor burners 7 and is supplied as coal for gasification to the reductor burners 9. On the other hand, char 17 produced by the gasifier 1 is supplied to the char burners 8.

Figure 2:
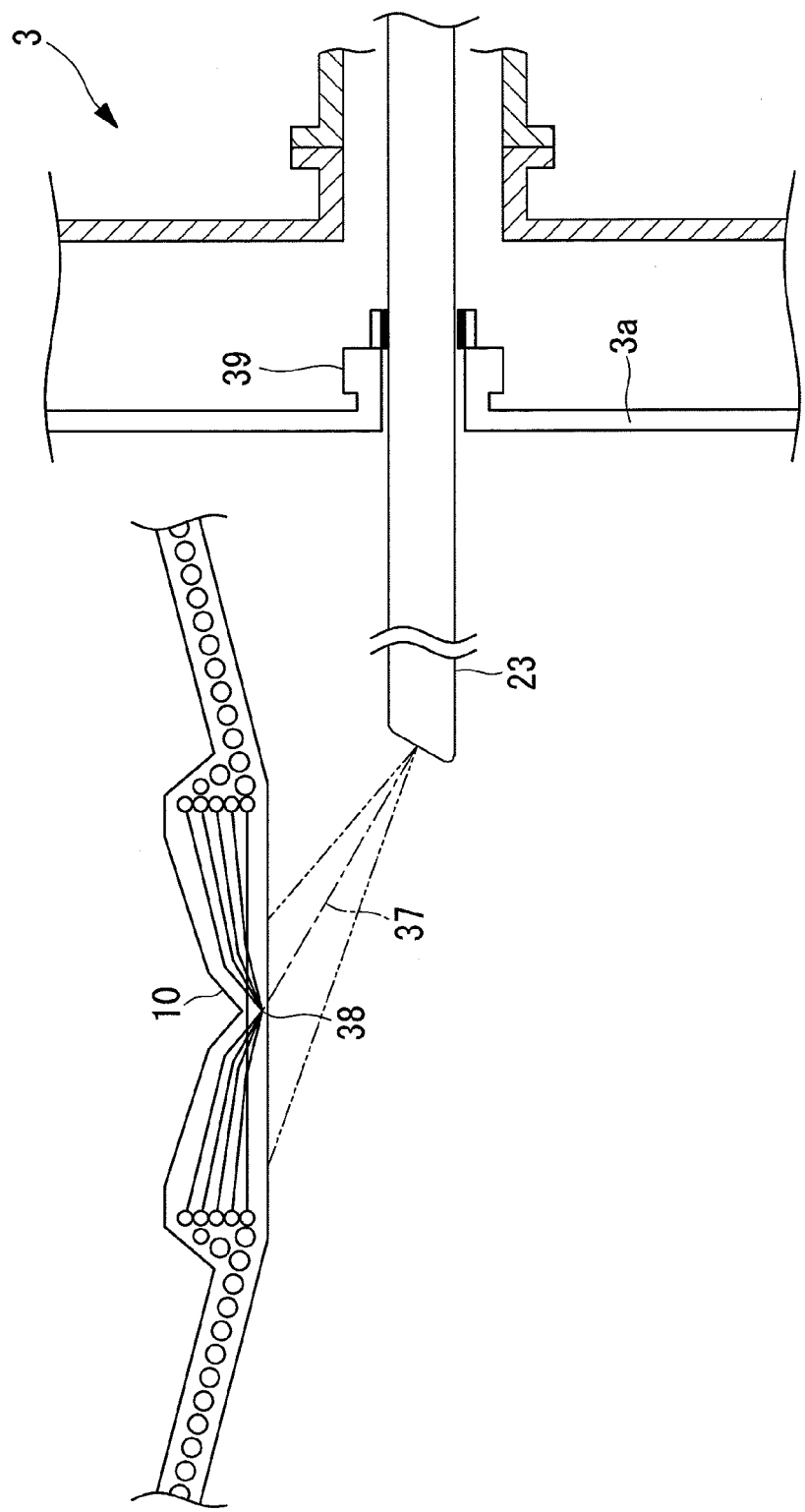
FIG. 2 is a sectional view showing the slag-melting burner apparatus in FIG. 1 and the vicinity thereof in an enlarged view.

As shown in FIG. 2, the slag-melting burner apparatus 23 is attached to a sidewall 3a of the kerosene combustion chamber 3 with a seal box 39 therebetween such that a burner axis 37 thereof passes through a slag-hole central point (the center of a circle forming the bottom edge of the slag hole 10) 38. In addition, a fuel pipe 24 (see FIG. 3) and an oxidant pipe 25 (see FIG. 3) extend through the slag-melting burner apparatus 23 in the longitudinal direction thereof.

Additionally, as shown in FIG. 1, the fuel pipe 24 is connected to LNG supply equipment 29 through an LNG valve 27 and a pipe. The oxidant pipe 25, on the other hand, is connected to oxygen supply equipment 31 through an oxygen valve 30, and the LNG valve 27 and the oxygen valve 30 are controlled by a control panel 32 (for example, disposed in a central control room).

Figure 3:
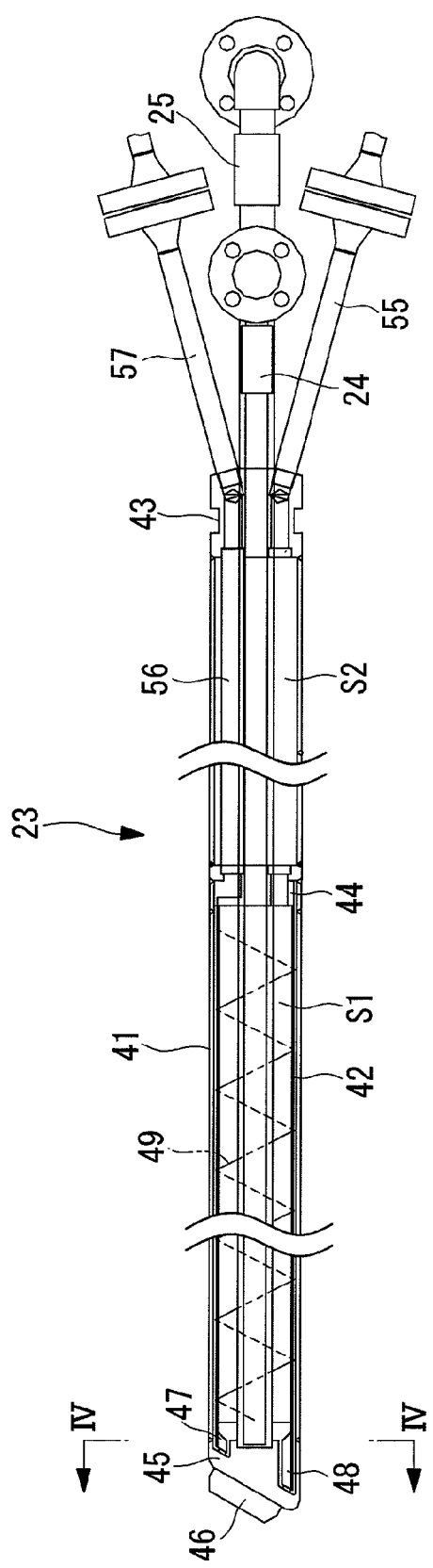
FIG. 3 is a schematic sectional view of the slag-melting burner apparatus according to the embodiment of the invention.

As shown in FIG. 3, the slag-melting burner apparatus 23 according to this embodiment includes an outer cylinder 41, an inner cylinder 42, a rear chamber 43, and a front chamber 44.

The outer cylinder 41 is a hollow cylindrical member accommodating the fuel pipe 24, the oxidant pipe 25, the inner cylinder 42, and the front chamber 44, with a burner tip metal 45 attached to the leading end thereof (the left end in FIG. 3) and the rear chamber 43 attached to the base end thereof (the right end in FIG. 3). In addition, a burner tip (not shown) having at least one (in this embodiment, five) nozzle (not shown) is attached to the end of the burner tip metal 45 with a mounting cap 46 therebetween.

A spray plate (not shown) is disposed between the burner tip metal 45 and the burner tip to eject LNG fuel 35 supplied through the fuel pipe 24 and oxygen 36 supplied through the oxidant pipe 25 into the kerosene combustion chamber 3, and ends of the fuel pipe 24 and the oxidant pipe 25 are connected (coupled) to the burner tip metal 45. The LNG fuel 35 and the oxygen 36 passing through the spray plate are ejected through the nozzles of the burner tip into the kerosene combustion chamber 3 and are ignited by molten slag (not shown) deposited around the slag hole 10, serving as an ignition source, thus forming a flame.

Figure 4:
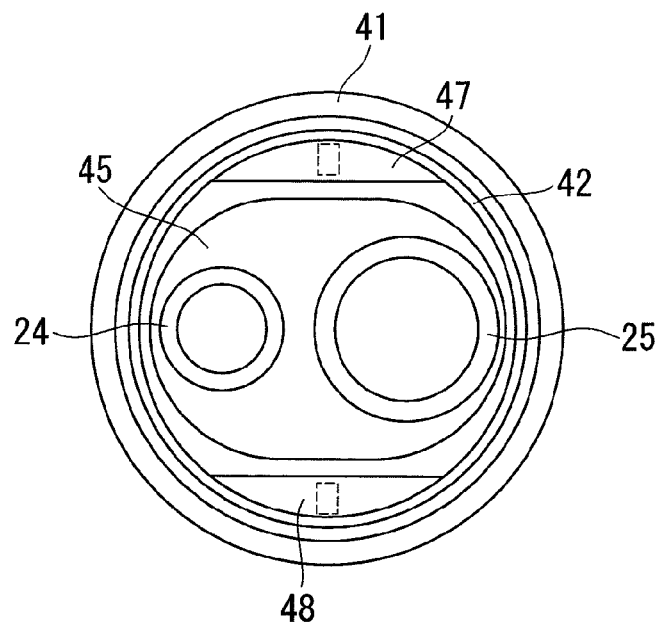
FIG. 4 is a sectional view taken along arrow IV-IV of FIG. 3.
Figure 5:
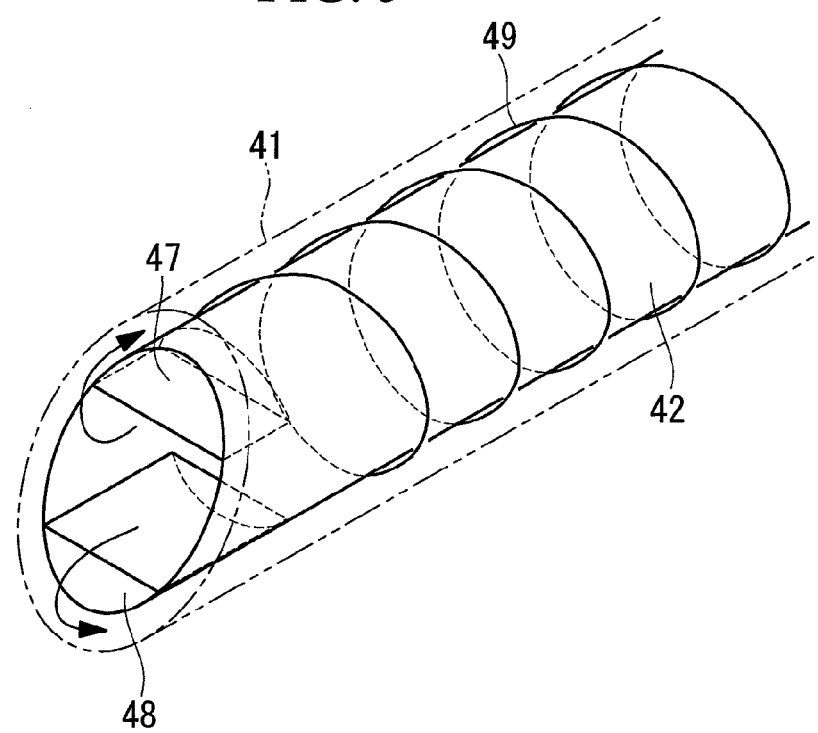
FIG. 5 is a perspective view showing a leading end of the slag-melting burner apparatus according to the embodiment of the invention in an enlarged view.
Figure 6:
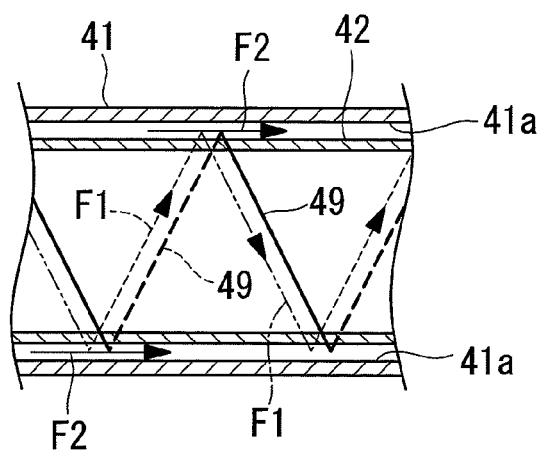
FIG. 6 is a diagram illustrating how cooling water flows between an outer cylinder and an inner cylinder.

As shown in FIG. 4, which is a sectional view taken along arrow IV-IV of FIG. 3, the inner cylinder 42 is a hollow cylindrical member accommodating the fuel pipe 24 and the oxidant pipe 25 and, as shown in FIGS. 4 and 5, having reducers 47 and 48 attached to the leading end thereof on the inner circumferential side. These reducers 47 and 48 narrow the channel for cooling water flowing out from one end of the inner cylinder 42 to increase the flow speed of the cooling water passing therebetween; in this embodiment, the reducer 47 is disposed on the upper side and the reducer 48 is disposed the lower side. In addition, these reducers 47 and 48 are attached to the inner cylinder 42 such that predetermined clearances are formed between the front end surfaces thereof (to the left in FIG. 3) and the rear end surface of the burner tip metal 45 (to the right in FIG. 3) when the inner cylinder 42 is attached to the outer cylinder 41. Furthermore, a spiral guide 49 is formed on the outer circumferential surface of the inner cylinder 42 to guide the cooling water downstream while applying a swirling flow to the cooling water. As shown in FIG. 6, the height of the guide 49 is set so that a predetermined clearance is formed between the end surface thereof (the circumferential end surface facing outward in the radial direction) and the inner circumferential surface 41a of the outer cylinder 41 when the inner cylinder 42 is attached to the outer cylinder 41, that is, so that a swirling flow F1 along the guide 49 and a substantially linear flow F2 along the longitudinal direction of the outer cylinder 41 and the inner cylinder 42 between the inner circumferential surface 41a of the outer cylinder 41 and the end surface of the guide 49 are formed between the outer cylinder 41 and the inner cylinder 42.

Figure 7:
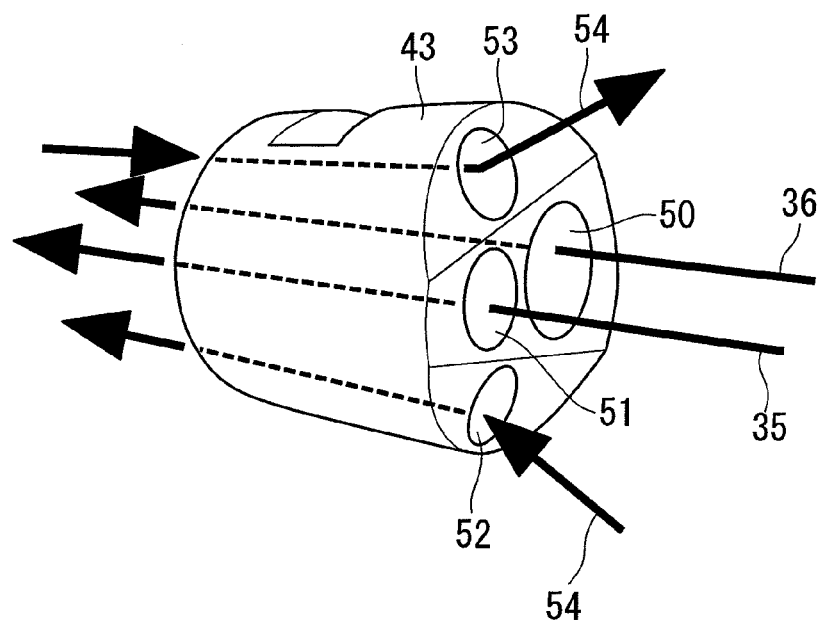
FIG. 7 is a perspective view showing a rear chamber of the slag-melting burner apparatus according to the embodiment of the invention in an enlarged view.

As shown in FIG. 7, the rear chamber 43 is a cylindrical member having four holes (a first hole 50, a second hole 51, a third hole 52, and a fourth hole 53) passing therethrough in the longitudinal direction thereof and attached to the base end of the outer cylinder 41. The first hole 50 is a hole accommodating the oxidant pipe 25, the second hole 51 is a hole accommodating the fuel pipe 24, and the third hole 52 is a hole for guiding the cooling water 54 into the interior of the outer cylinder 41 between the rear chamber 43 and the front chamber 44, with a cooling water supply pipe 55 (see FIG. 3) connected (coupled) to the inlet of the third hole 52. The fourth hole 53 is a hole for guiding the cooling water 54 guided through a connecting pipe 56 (see FIG. 3) connected (coupled) to the inlet thereof to the outside, with a cooling water return pipe 57 (see FIG. 3) connected (coupled) to the outlet of the fourth hole 53.

Figure 8:
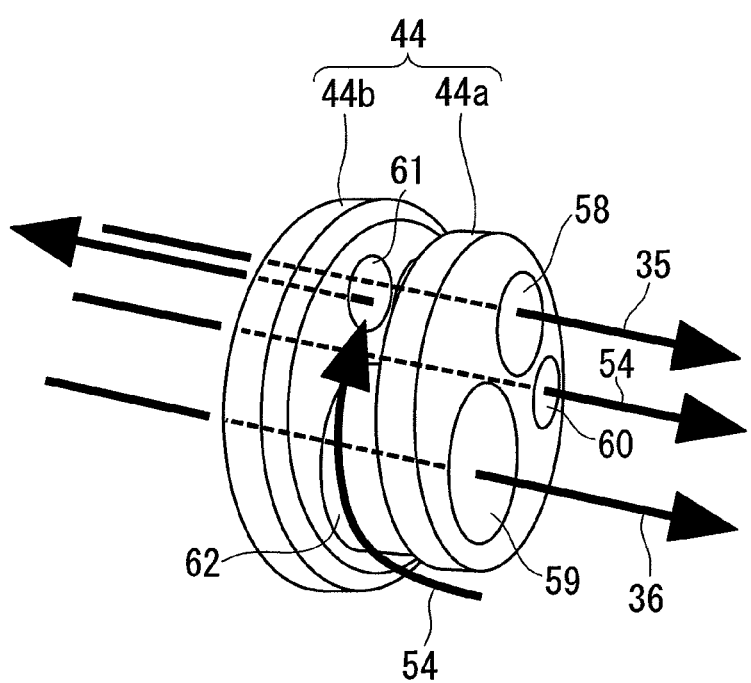
FIG. 8 is a perspective view showing a front chamber of the slag-melting burner apparatus according to the embodiment of the invention in an enlarged view.

As shown in FIG. 8, the front chamber 44 is a substantially cylindrical member including a small-diameter portion 44a at one end thereof (to the right in FIG. 8) and a large-diameter portion 44b at the other end thereof (to the left in FIG. 8) and having four holes (a first hole 58, a second hole 59, a third hole 60, and a fourth hole 61) passing therethrough in the longitudinal direction thereof. The front chamber 44, disposed in the interior of the outer cylinder 41 between the burner tip metal 45 and the rear chamber 43, also serves as a member for dividing (partitioning) the interior of the outer cylinder 41 into a space S1 on the leading end side (see FIG. 3) and a space S2 on the base end side (see FIG. 3). The front chamber 44 is attached to the outer cylinder 41 such that the outer circumferential surface of the large-diameter portion 44b is flush with the outer circumferential surface of the outer cylinder 41. The inner cylinder 42, on the other hand, is attached to the front chamber 44 such that the outer circumferential surface thereof is flush with the outer circumferential surface of the small-diameter portion 44a. The first hole 58 is a hole accommodating the fuel pipe 24, and the second hole 59 is a hole accommodating the oxidant pipe 25. The third hole 60 is a hole for guiding the cooling water 54 into the inner cylinder 42. The fourth hole 61 is a hole for guiding the cooling water 54 guided through a channel 62 formed along the circumferential direction between the small-diameter portion 44a and the large-diameter portion 44b into the connecting pipe 56 (see FIG. 3) connected (coupled) to the outlet of the large-diameter portion 44b.

Next, the flow of the cooling water 54 will be described using FIGS. 9 to 12.

Figure 9:
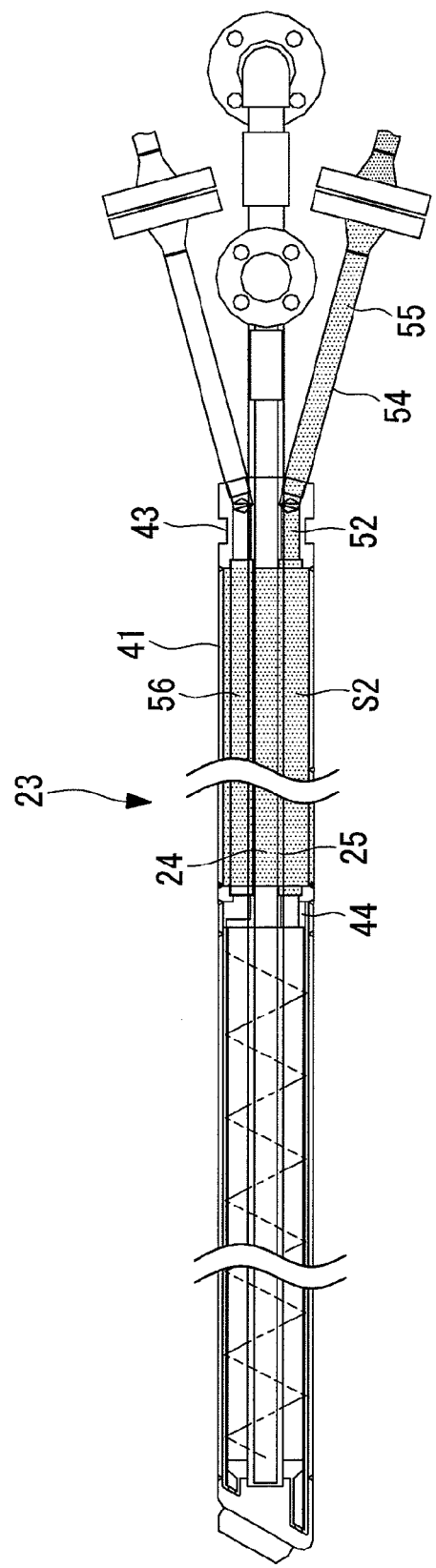
FIG. 9 is a diagram illustrating how the cooling water flows through the slag-melting burner apparatus according to the embodiment of the invention.

As shown in FIG. 9, the cooling water 54 is guided through the cooling water supply pipe 55 to the inlet of the third hole 52 formed in the rear chamber 43 and then flows through the third hole 52 into the space S2 (more specifically, the space surrounded by the inner circumferential surface 41a (see FIG. 6) of the outer cylinder 41, the front end surface (to the left in FIG. 9) of the rear chamber 43, and the rear end surface (to the right in FIG. 9) of the front chamber 44).

The connecting pipe 56, the fuel pipe 24, and the oxidant pipe 25 disposed in the space S2 are each sealed so that the cooling water guided into the space S2 does not intrude therein.

Figure 10:
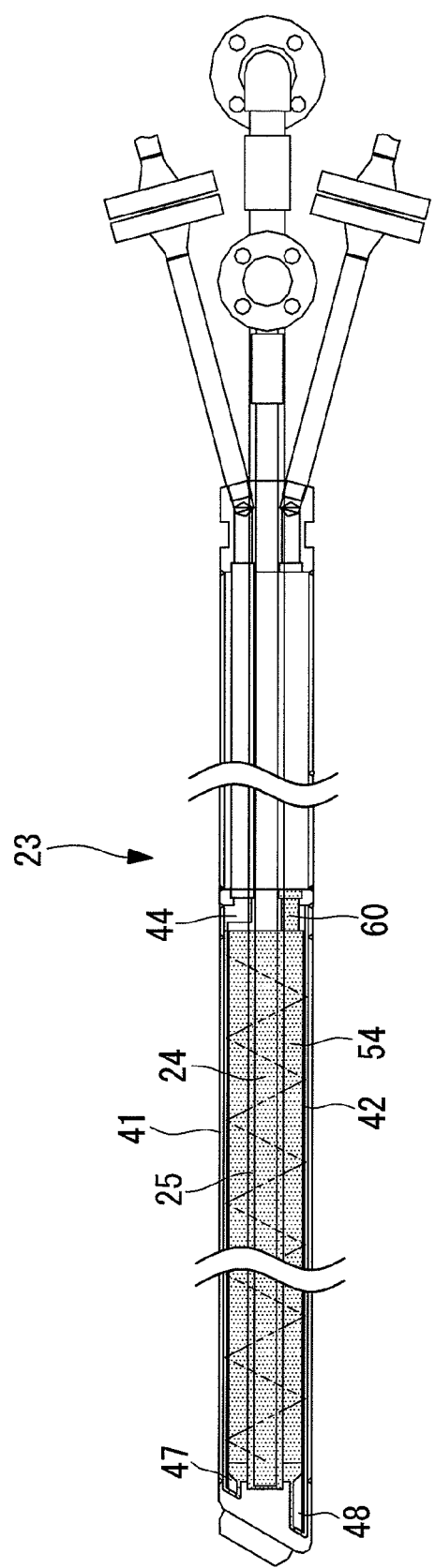
FIG. 10 is a diagram illustrating how the cooling water flows through the slag-melting burner apparatus according to the embodiment of the invention.

As shown in FIG. 10, the cooling water leaving the space S2 flows through the third hole 60 formed in the front chamber 44 into the inner space of the inner cylinder 42 (more specifically, the space surrounded by the inner circumferential surface of the inner cylinder 42, the front end surface (to the left in FIG. 10) of the front chamber 44, and the rear end surfaces (to the right in FIG. 10) of the reducers 47 and 48).

The fuel pipe 24 and the oxidant pipe 25 disposed in the inner space of the inner cylinder 42 are each sealed so that the cooling water guided into the inner space of the inner cylinder 42 does not intrude therein.

Figure 11:
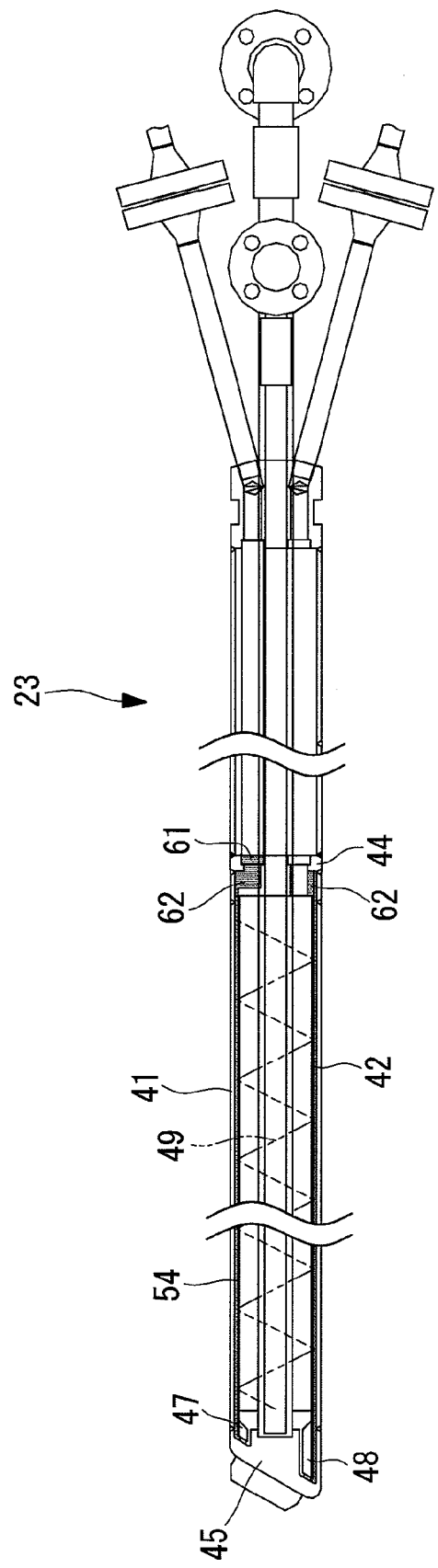
FIG. 11 is a diagram illustrating how the cooling water flows through the slag-melting burner apparatus according to the embodiment of the invention.

As shown in FIG. 11, the cooling water leaving the inner space of the inner cylinder 42 flows into the space between the outer cylinder 41 and the inner cylinder 42 through the clearances between the inner circumferential surfaces of the reducers 47 and 48 and the burner tip metal 45, the clearances between the front end surfaces of the reducers 47 and 48 and the rear end surface of the burner tip metal 45, and the clearances between the outer circumferential surfaces of the reducers 47 and 48 and the inner circumferential surface 41a (see FIG. 6) of the outer cylinder 41. As shown in FIG. 6, the cooling water 54 flowing into the space between the outer cylinder 41 and the inner cylinder 42 flows downstream as the swirling flow F1 along the guide 49 and the substantially linear flow F2 in the longitudinal direction of the outer cylinder 41 and the inner cylinder 42 and is guided into the fourth hole 61 through the channel 62 formed in the front chamber 44.

The cooling water flowing into the space between the outer cylinder 41 and the inner cylinder 42 through the clearances between the outer circumferential surfaces of the reducers 47 and 48 and the inner circumferential surface 41a of the outer cylinder 41 is all guided into the fourth hole 61 through the channel 62 formed in the front chamber 44.

Figure 12:
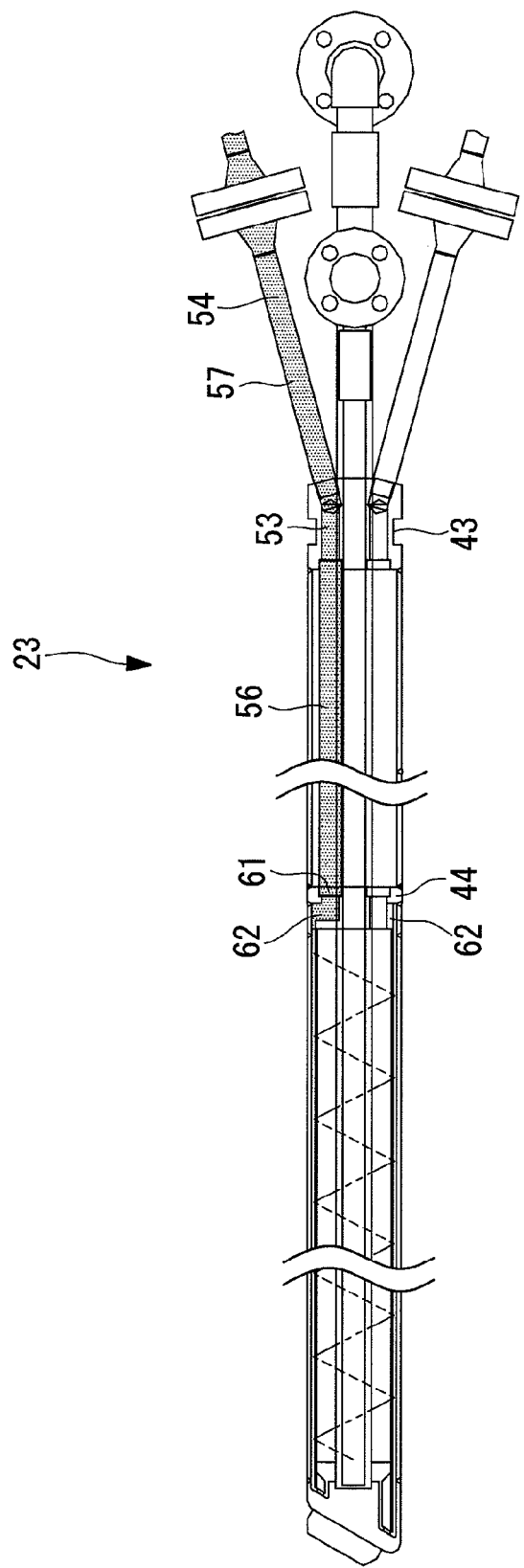
FIG. 12 is a diagram illustrating how the cooling water flows through the slag-melting burner apparatus according to the embodiment of the invention.

As shown in FIG. 12, the cooling water leaving the fourth hole 61 formed in the front chamber 44 is guided through the connecting pipe 56 into the fourth hole 53 of the rear chamber 43 and is then discharged outside through the cooling water return pipe 57.

In the slag-melting burner apparatus 23 according to this embodiment, at least the portion inserted into the kerosene combustion chamber 3 has a double-walled structure including the outer cylinder 41 and the inner cylinder 42, and the cooling water that has been supplied through the interior of the inner cylinder 42 to the leading end (more specifically, to the burner tip metal 45 and the mounting cap 46) and that has cooled the leading end (more specifically, the burner tip metal 45, the burner tip, and the mounting cap 46) is returned to the base end (more specifically, to the front chamber 44) through the space between the inner cylinder 42 and the outer cylinder 41, which has a smaller channel area than the inner cylinder 42. During this process, as shown in FIG. 6, the cooling water 54 flowing into the space between the outer cylinder 41 and the inner cylinder 42 flows downstream at an increased flow speed as the swirling flow F1 along the guide 49 and the substantially linear flow F2 in the longitudinal direction of the outer cylinder 41 and the inner cylinder 42.

This prevents a phenomenon (DNB: departure of nuclear boiling) by which the wall temperature of the outer cylinder 41 rises abruptly as a layer of steam covers the inner circumferential surface 41a of the outer cylinder 41 and therefore decreases the heat transfer coefficient thereof, thus preventing heat damage to the outer cylinder 41.

In addition, it is possible to prevent burnout of the burner resulting from insufficient cooling due to variations in cooling efficiency at the leading end of the burner.

In the slag-melting burner apparatus 23 according to this embodiment, additionally, because the channel area of the leading end (specifically, each of the channel area between the inner circumferential surfaces of the reducers 47 and 48 and the burner tip metal 45, the channel area between the front end surfaces of the reducers 47 and 48 and the rear end surface of the burner tip metal 45, and the channel area between the outer circumferential surfaces of the reducers 47 and 48 and the inner circumferential surface 41a of the outer cylinder 41) is set to be smaller than the channel area of the inner cylinder 42, the flow speed of the cooling water at the leading end (more specifically, the burner tip metal 45, the burner tip, and the mounting cap 46) can be increased to efficiently and uniformly cool the leading end, thus preventing heat damage to the leading end.

In the embodiment described above, it is more preferable that the portion of the slag-melting burner apparatus 23 inserted into the kerosene combustion chamber 3 can be extended into and retracted from the kerosene combustion chamber 3. That is, it is more preferable that the portion of the slag-melting burner apparatus 23 inserted into the kerosene combustion chamber 3 can be retracted from the kerosene combustion chamber 3 when the slag-melting burner apparatus 23 is not in use (not in operation).

This more effectively prevents heat damage to the portion of the slag-melting burner apparatus 23 inserted into the kerosene Combustion chamber 3.

REFERENCE SIGNS LIST 1 two-stage entrained-flow bed coal gasifier
4 combustor
5 reductor
10 slag hole
23 slag-melting burner apparatus
41 outer cylinder
42 inner cylinder
49 guide
54 cooling water
F1 swirling flow
F2 substantially linear flow

The invention claimed is:

1. A slag-melting burner apparatus for a two-stage entrained-flow bed coal gasifier that combusts pulverized coal carried by a gas in a combustor and feeds pulverized coal similarly carried by a gas to a combustion gas in a reductor to carbonize and gasify the pulverized coal while discharging incombustible residue from a slag hole as molten slag, the slag-melting burner apparatus, comprising:

a leading end of the burner apparatus configured to be located in the two-stage entrained-flow bed coal gasifier, the leading end of the burner apparatus having a double-walled structure including an outer cylinder and an inner cylinder, wherein cooling water for cooling the leading end of the burner apparatus is supplied through an interior of the inner cylinder to cool an extremity of the leading end of the burner apparatus and is then returned to a base end through a space formed between the outer cylinder and the inner cylinder; and wherein a front chamber is provided for partitioning the interior of the outer cylinder into a first space on the leading end side and a second space on a base end side, and the front chamber includes a large-diameter portion at the base end side of the outer cylinder, in which an outer circumferential surface of the large-diameter portion is flush with an outer circumferential surface of the outer cylinder, and includes a small-diameter portion at a leading end side of the burner apparatus, in which an outer circumferential surface of the inner cylinder is flush with an outer circumferential surface of the small-diameter portion, wherein the front chamber has a first hole for guiding the cooling water into the front chamber, and a second hole for discharging the cooling water from the front chamber, the first and second holes extending in a longitudinal direction of the burner apparatus, wherein the space formed between the outer cylinder and the inner cylinder has a smaller channel area than the interior of the inner cylinder, and a swirling flow along a guide formed on an outer circumferential surface of the inner cylinder and a substantially linear flow in a longitudinal direction of the outer cylinder and the inner cylinder, at a position between an end surface of the guide and an inner circumferential surface of the outer cylinder opposing the guide, are applied to the cooling water returned to the base end through the space formed between the outer cylinder and the inner cylinder, the cooling water from a channel formed between the large-diameter portion and the small-diameter portion of the front chamber is discharged to an outside through a third hole defined by a rear chamber provided at the base end side of the burner apparatus, and wherein the outer cylinder is configured to be directly exposed in the two-stage entrained flow bed coal gasifier.

2. The slag-melting burner apparatus according to claim 1, wherein
the swirling flow and the substantially linear flow within the space prevent a phenomenon of departure of nuclear boiling that decreases a heat transfer coefficient.

3. The slag-melting burner apparatus according to claim 1, wherein the extremity of the leading end of the burner apparatus has a smaller channel area than the interior of the inner cylinder.

4. The slag-melting burner apparatus according to claim 1, wherein the leading end of the burner apparatus located in the two-stage entrained-flow bed coal gasifier is extendable into and retractable from the two-stage entrained-flow bed coal gasifier.

5. The slag-melting burner apparatus according to claim 3, wherein the leading end of the burner apparatus located in the two-stage entrained-flow bed coal gasifier is extendable into and retractable from the two-stage entrained-flow bed coal gasifier.

6. A two-stage entrained-flow bed coal gasifier, comprising: the slag-melting burner apparatus according to claim 1.

7. A coal gasification combined cycle power plant, comprising: the two-stage entrained-flow bed coal gasifier according to claim 6.

8. A two-stage entrained-flow bed coal gasifier, comprising: the slag-melting burner apparatus according to claim 3.

9. A two-stage entrained-flow bed coal gasifier, comprising: the slag-melting burner apparatus according to claim 4.

* * * * *